(12) United States Patent　　　(10) Patent No.:　US 12,607,300 B2

Seddik　　　　　　　　　　　　　　(45) Date of Patent:　　Apr. 21, 2026

(54) SECURITY SYSTEM FOR A CONVERTING MACHINE

(71) Applicant: BOBST LYON, Bron (FR)

(72) Inventor: Bouhadjar Ahmed Seddik, Pont Evêque (FR)

(73) Assignee: BOBST LYON, Bron (FR)

( * ) Notice: Subject to any disclaimer, the term of this patent is extended or adjusted under 35 U.S.C. 154(b) by 100 days.

(21) Appl. No.: 18/699,726

(22) PCT Filed: Oct. 26, 2022

(86) PCT No.: PCT/EP2022/079953

§ 371 (c)(1),
(2) Date: Apr. 9, 2024

(87) PCT Pub. No.: WO2023/073033

PCT Pub. Date: May 4, 2023

(65) Prior Publication Data

US 2024/0401740 A1　　　Dec. 5, 2024

(30) Foreign Application Priority Data

Oct. 29, 2021　　(EP) ..................................... 21315231

(51) Int. Cl.
F16P 3/14　　　　(2006.01)
B31B 50/00　　　(2017.01)
B31B 120/30　　(2017.01)

(52) U.S. Cl.
CPC ............ F16P 3/144 (2013.01); B31B 50/006 (2017.08); F16P 3/148 (2013.01); B31B 2120/302 (2017.08)

(58) Field of Classification Search
CPC ......... F16P 3/144; F16P 3/148; B31B 50/006; B31B 2120/302
See application file for complete search history.

(56) References Cited

U.S. PATENT DOCUMENTS

2009/0058642 A1* 3/2009 Fukumura ................ G01V 8/20
　　　　　　　　　　　　　　　　　　　　340/556
2014/0097334 A1 4/2014 Hotta et al.
　　　　　　　　　　(Continued)

FOREIGN PATENT DOCUMENTS

DE　　202020102721 U1　12/2020
EP　　　　1329662 A2　　7/2003
　　　　　　　(Continued)

*Primary Examiner* — Seung C Sohn

(74) *Attorney, Agent, or Firm* — Bookoff McAndrews, PLLC

(57) ABSTRACT

The present invention relates to a security system (10) for securing a restricted access area in a converting machine. The security system (10) comprises a detection unit (20) comprising a plurality of sensors (22) arranged side by side an having a vertical sensing direction. Each sensor has an individual control zone (Z). The detection unit is configured to detect control signals (23) indicating an arrival time (t1) and a departure time (t2) of an object (24, 32) transported through each of the control zones. The security system further comprises an evaluation unit (26) configured to receive the control signals (23) from the detection unit and a memory (25) containing a program to cause the evaluation unit to determine an error state indicating the presence of a prohibited access based on the control signals (23).

11 Claims, 10 Drawing Sheets

(56) References Cited

U.S. PATENT DOCUMENTS

| | | | |
|---|---|---|---|
| 2015/0301221 A1 | 10/2015 | Kikuchi et al. | |
| 2016/0097878 A1* | 4/2016 | Kikuchi | F16P 3/144 |
| | | | 250/221 |

FOREIGN PATENT DOCUMENTS

| | | | |
|---|---|---|---|
| EP | 3524870 | A1 | 8/2019 |
| JP | H07275942 | A | 10/1995 |
| JP | 2003218679 | A | 7/2003 |
| JP | 2007237069 | A | 9/2007 |
| JP | 2014077660 | A | 5/2014 |
| JP | 2015206635 | A | 11/2015 |
| JP | 2021513634 | A | 5/2021 |

* cited by examiner

SECURITY SYSTEM FOR A CONVERTING MACHINE

CROSS-REFERENCE TO RELATED APPLICATION(S)

This application is a National Stage Application under 35 U.S.C. § 371 of International Application No. PCT/EP2022/079953, filed on Oct. 26, 2022, which claims priority to European Application No. 21315231.7, filed on Oct. 29, 2021, the entireties of which are incorporated herein by reference.

FIELD OF THE INVENTION

The present invention relates to a security system and a method for preventing prohibited access in a converting machine.

BACKGROUND

Converting machines such as rotary die-cutting machines and folder-gluer machines are used in the production of paperboard and cardboard boxes, such as flat-packed or folding boxes.

These machines comprise a plurality of workstations which may print, cut and crease a sheet substrate. Overall, it is desirable to prevent human access to moving machine parts during the operation of the converting machine. Auxiliary modules such as a palletizer and breaker module can be located at a downstream section of a rotary die-cutting machine. It is especially desirable to secure the palletizer and breaker modules to prevent operator injury.

It is known to use light barriers or scanning devices which form an immaterial barrier closure to a restricted access area of a machine workstation, such as a palletizer module. If a human passes through the light barrier, it will generate a shut-down signal to the machine. Such a light barrier is however muted at certain times in order to let a pile of stacked boxes pass through.

During the muting time, there is a remaining risk of an operator or another prohibited object to cross the light barrier together with the transported object.

SUMMARY

In view of the above-mention problems, it is an object of the present invention to provide an improved security system, which has a capacity of detecting a prohibited object even when a light barrier is muted.

This object is solved by a security system according to claim 1 and a method according to claim 11.

According to a first aspect of the present invention, there is provided a security system for a converting machine, the security system comprising:

a detection unit comprising a plurality of sensors arranged side by side and wherein each sensor having an individual control zone, the detection unit being configured to detect an arrival time to each control zone and a departure time from each control zone of an object transported through the control zones, the arrival time and the departure time of the object being determined from control signals from each sensor, and wherein the control signals from each sensor comprise a rising signal and falling signal, and wherein each sensor having a vertical sensing direction, an evaluation unit configured to receive the control signals from each sensor of the detection unit and determine the arrival time from the rising signal and departure time from the falling signal and to provide an error signal when an error state is determined, and a memory containing a program to cause the evaluation unit to determine an error state indicating the presence of a prohibited object based on the arrival time and/or the departure time in each control zone.

The present invention is based on a realization that an additional safety system can be used individually or in combination with a light barrier in order to analyze a geometry of a transported object in greater detail. In such a way, prohibited objects such as a human can be detected regardless of a muting time of a light barrier.

Since the evaluation is based on an analysis of individual control signals, a more precise detection mechanism can be achieved.

Advantageously, the detection does not rely on distance-dependent detection mechanisms. Rather the presence of an object within a respective control zone is sufficient. Hence, the sensors do not require to be capable of detecting any precise distance to determine the height of the transported object.

In an embodiment, the security system further comprises a light barrier system comprising a light barrier and a muting device, the muting device comprising an upstream muting detector and a downstream muting detector located on opposite sides of the light barrier, and wherein the security system comprises a control unit configured to activate the muting device in order to mute the light barrier when an admissible object to be transported is detected by the upstream muting detector, and to activate the light barrier when the admissible object is detected by the downstream muting detector, and wherein the sensors in the detection unit are configured to be activated when the upstream muting detector generates a muting signal and the light barrier is muted, and wherein the control unit is configured to receive the error signal from the evaluation unit and to generate a stop signal when an error state is detected.

In an embodiment, the sensors are positioned in a line at an equal distance from each other. The sensors may comprise a photoelectric cell, a laser scanner, or a capacitive sensor.

In an embodiment, the evaluation unit is further configured to calculate a time duration between a rising signal and a falling signal from each sensor and the evaluation unit is configured to determine an error state if the time duration differs for each sensor.

In an embodiment, the evaluation unit is further configured to calculate a phase shift between rising signals of directly adjacent sensors, and the error state is determined when a phase shift is present.

The evaluation unit may be configured to determine a first order sequence of first state-to-second state switch events of received control signals and a second order sequence of second state-to-first state switch events of received control signals, and the error state is determined based on differences between the first order sequence and the second order sequence.

In an embodiment, the evaluation unit is configured to determine an interpolated first timeline defined by first state-to-second state switch events of received control signals and to determine an interpolated second timeline defined by second state-to-first state switch events of received control signals, and the error state is determined based on non-parallel first and second timelines.

The security system may further comprise a control unit, configured to generate a stop signal to deactivate a workstation of a converting machine or to deactivate an entire converting machine when an error signal is received from the evaluation unit.

According to a second aspect of the present invention, there is provided a converting machine comprising the security system according to any one of the preceding aspect or embodiments, and the sensors are horizontally arranged above a travel path in the converting machine and positioned over an access opening to a restricted access area in the converting machine.

According to a third aspect of the present invention, there is provided a method for securing a restricted access area in a converting machine, the method comprising the steps of:

Detecting an arrival time and a departure time of an object within control zones of a plurality of sensors, the sensors having a vertical sensing direction, Receiving control signals from each sensor to an evaluation unit, the control signals defining the arrival time from a rising signal and the departure time from a falling signal, Determining the presence of a prohibited object based on the arrival time and departure time of each control signal.

In an embodiment, before detecting an arrival time and departure time of an object, the method further comprises the steps of:

Receiving information from an upstream muting detector and generating a muting signal to turn off a light barrier when an admissible object to be transported is detected, and Activating the plurality of sensors in the detection unit when the light barrier is turned off.

In an embodiment, the presence of the prohibited object is determined by the evaluation unit based on at least one of the following steps:

A difference between a time duration for each of the control signals from a first state to a second state from each sensor, and/or A phase shift between subsequent switching points in time of different individual control signals from different sensors, and/or A difference between a first order sequence of a first state-to-second state switch events of control signals and a second order sequence of second state-to-first state switch events of control signals, and/or Non-parallel interpolated first and second timelines, wherein the interpolated first timeline is defined by first state-to-second state switch events of control signals and the interpolated second timeline is defined by second state-to-first state switch events of control signals.

BRIEF DESCRIPTION OF THE DRAWINGS

The invention will now be described with reference to the appended drawings, in which like features are denoted with the same reference numbers and in which:

FIGS. 5a and 5b are schematic drawings of another intrusion scenario, FIGS. 9a and 9b are schematic drawings of a further intrusion scenario.

DETAILED DESCRIPTION

Figure 1:
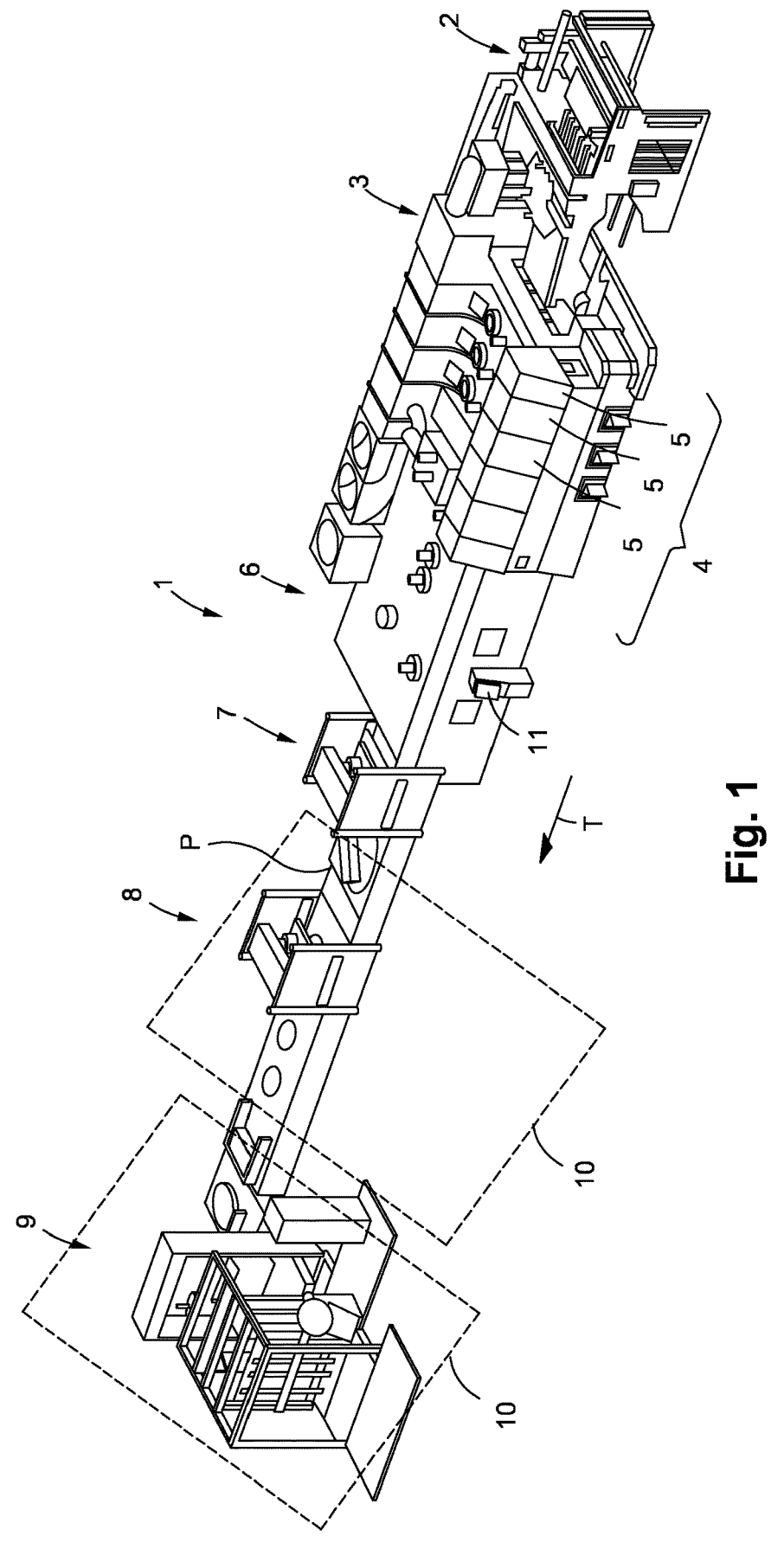
FIG. 1 is a schematic drawing of a converting machine.

FIG. 1 illustrates a converting machine 1 in the form of a rotary die-cutter machine 1. The converting machine 1 comprises a plurality of workstations in the form of modules. Several configurations are possible, but an exemplary converting machine 1 may comprise a prefeeder module 2, a feeder module 3, a printing module 4 comprising a plurality of printing units 5, a die-cutting module 6, a stacker module 7 and at least one auxiliary workstation such as a breaker module 8 or a palletizer module 9. A main operator interface 11 may also be provided in the proximity of the converting machine 1.

The feeder module 3 is configured to feed sheet substrates into the converting machine 1. The sheet substrates are transformed into blanks and transported on a transportation path P along a direction of transportation T through the converting machine 1. Before the breaker module 8, the blanks may comprise a plurality of juxtaposed box blanks which need to be separated.

A security system 10 is located at a workstation in the converting machine 1. The security system can advantageously be located at the breaker module 8 or the palletizer module 9 and is further illustrated in FIG. 2. However, it is possible to arrange the security system around any of the previously mentioned modules 2, 3, 4, 5, 6 or 7. For simplicity, the following description will describe the security system 10 arranged at the breaker module 8 or the palletizer module 9.

Figure 2:
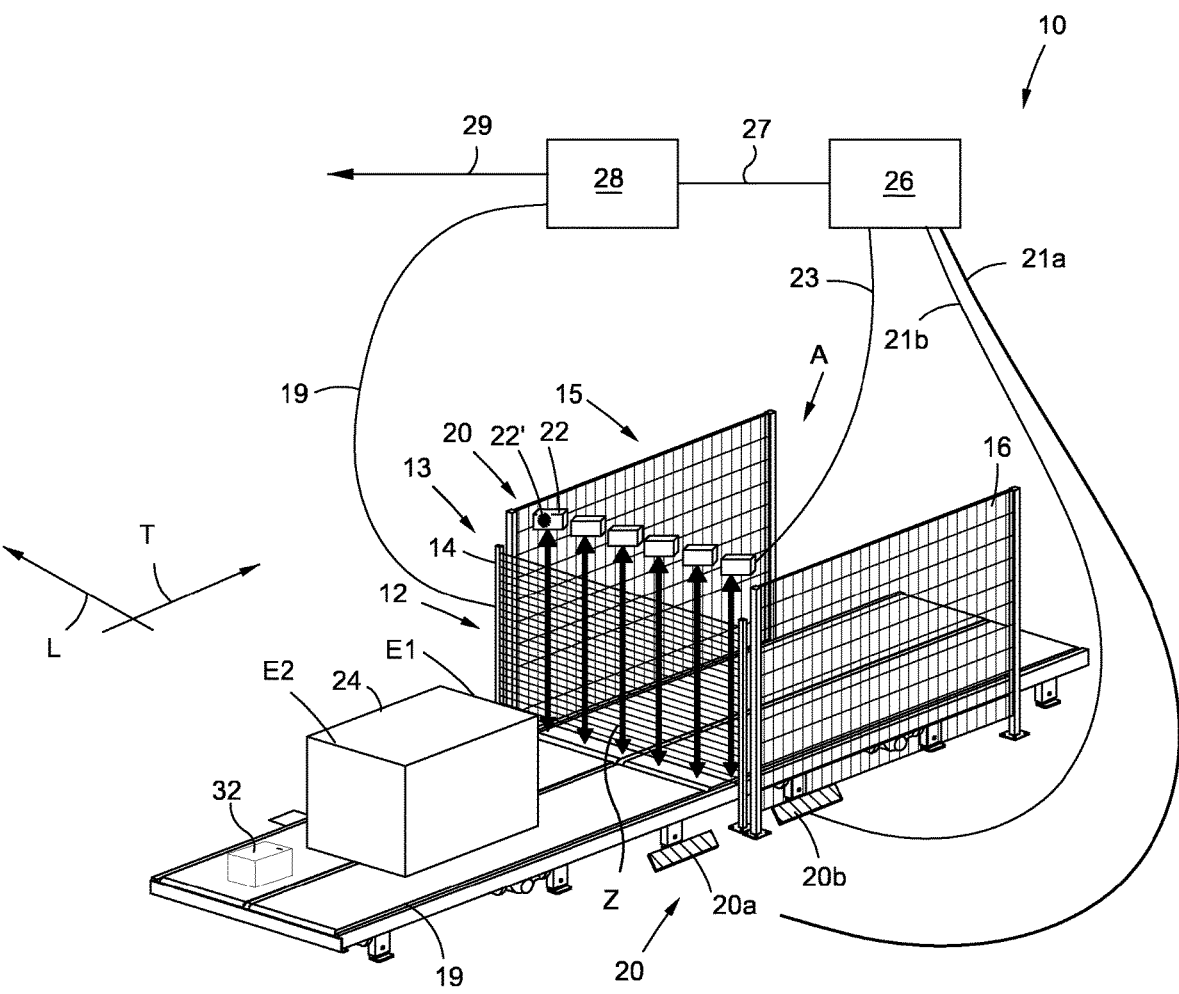
FIG. 2 is a schematic perspective view of a security system around a restricted access area.

As illustrated in FIG. 2, a restricted access area A is arranged within an enclosure 15. The workstation 8, 9 is arranged within the restricted access area A. Preferably, a portion of the enclosure 15 is formed by a physical side barrier 16, such as a fence. The workstation 8, 9 is configured to receive admissible objects 24 in the form of blanks or stacks with a plurality of superposed blanks. The admissible object 24 can be transported into the restricted area by a conveyor 19, such as a conveyor belt 19.

The enclosure 15 prevents unauthorized access for prohibited objects 32 to the workstation 8, 9. The prohibited object 32 can be a human, such as a machine operator or a physical object, such as a tool. The prohibited object 32 is thus an object different from the admissible objects 24.

Within the context of this application the term "object 24, 32" thus refers to either the admissible object 24 in isolation, or a combination of the admissible object 24 and the prohibited object 32 positioned in close proximity with each other.

The enclosure 15 has an access opening 12, which can be secured by a light barrier system 13 comprising a light barrier 14, and a muting device 20 comprising an upstream muting detector 20a and a downstream muting detector 20b. The upstream muting detector 20a is thus located upstream or before the light barrier 14 in the direction of transportation T and the downstream muting detector 20b is located downstream or after the light barrier in the direction of transportation T. The light barrier 14 may have a plurality of optical transmitters and receivers which will detect an error state if a transmitted light signal is not received by its associated receiver.

The upstream muting detector 20a and the downstream muting detector 20b are arranged on opposite sides of the light barrier 14. The upstream muting detector 20a is configured to send control signals 21a to mute, i.e. turn the light barrier 14 off when an admissible object 24 is in a detection zone of the upstream muting detector 20a. In a similar manner, the downstream muting detector 20b is configured to send control signals 21b to re-activate the light barrier 14 when the object 24 is in a detection zone of the second muting detector 20b. The light barrier 14 is thus muted to allow the admissible object 24 to enter the restricted area A.

A problem arises if the prohibited object 32 is placed in proximity with the admissible object 24 to be transported. In such a scenario, there is a possibility that the prohibited object 32 may be able to pass the light barrier 14 together with the admissible object 24 during the muting time of the light barrier 14.

Figure 3:
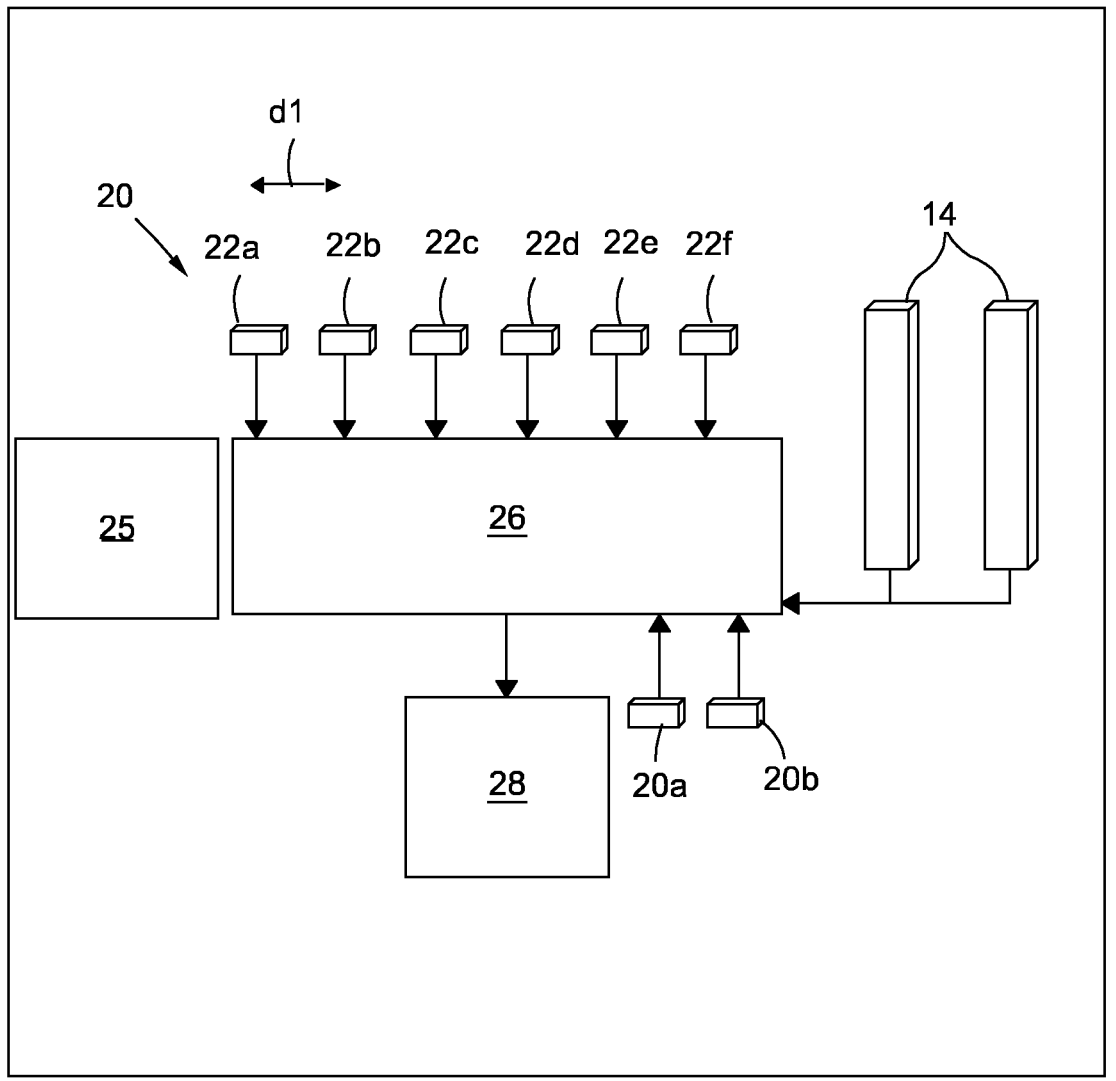
FIG. 3 is a schematic drawing of the electrical architecture of the safety device.

To prevent this possibility, the restricted access area A is provided with the security system 10 according to the present invention. As illustrated in FIGS. 2 and 3, the security system 10 may further comprise the light barrier system 13 and a detection unit 20, an evaluation unit 26, and a memory 25. The security system 10 may also comprise a control unit 28.

The detection unit 20 is horizontally arranged above a travel path P in the converting machine and is positioned over the access opening 12 and comprises a plurality of sensors 22a to 22f arranged side by side. The sensors 22a to 22f each comprise a sensing element 22' having an individual control zone Z and a control circuitry configured to send control signals 23a to 23f to the evaluation unit 26. Each sensor has a vertical sensing direction. The different sensors are referenced using a common number 22 and a letter from a to f, the letter being used to distinguish a particular sensor in the plurality. Reference 22 without a letter designates any sensor among the plurality of sensors or the plurality of sensors. The sensors 22 can be placed in a line at an equal distance d1 from each other. The distance d1 can for instance be selected such that the distance between each control zone Z is smaller than a predefined width of a person or a body part of a person.

Each sensor 22a to 22f is configured to sense when its control zone Z is occupied by an object 24, 32. The sensors 22a to 22f may be in the form of photoelectric cells, laser scanners, or capacitive sensors. In some configurations, combinations of these sensor types may be used.

Each sensor 22 is configured to provide a control signal 23, having a first state if its respective control zone Z is unoccupied and a second state if its respective control zone Z is occupied by an object 24, 32.

The control signals are referenced using a common number 23 and a letter from a to f, the letter being used to distinguish a particular signal in the plurality. Reference 23 without a letter designates any signal among the plurality of signals or the plurality of signals.

The control signal 23 can be generated independently from the shape of the object 24, 32. Each sensor 22 is thus configured to detect the presence of an object 24, 32 in its respective control zone Z. The occupation of the respective control zone Z is sufficient to trigger the respective control signal 23. The change in state can be characterized by a rising signal 36a when the object 24, 32 enters the control zone Z of the sensor 22 and a falling signal 36b upon the departure of the object 24, 32 from the control zone Z.

The muting detectors 20a, 20b are configured to individually provide a control signal 21a, 21b to either mute or activate the light barrier 14. The muting signal 21a is generated when the respective muting zone is occupied by an object 24, 32. The muting signal 21 can be generated independently from a shape of the object 24, 32. Alternatively, the muting signal 21a can be issued based on an analysis of the characteristics of the object 24, 32, such as its arrival time to the upstream muting detector 20a.

In an embodiment, the security system 10 may optionally comprise a second detection unit (non-illustrated), which is vertically arranged and provided with sensors having a horizontal detection direction. This may further improve the detection of prohibited objects 32 arranged above the admissible object 24 to be transported.

The evaluation unit 26 is preferably connected to the muting detectors 20a, 20b and the sensors 22. The evaluation unit 26 is configured to receive the muting signals 21a, 21b of the respective muting detectors 20a, 20b and the control signals 23 from the respective sensors 22. Based on the received signals 21, 23, the evaluation unit 26 may determine an error state and provide an error signal 27.

The control unit 28 receives the error signal 27 from the evaluation unit 26 and is configured to control the operation of the converting machine 1. Upon reception of an error signal 27 from the evaluation unit 26, the control unit 28 may generate a stop signal 29 to deactivate the workstation 8, 9 located inside the restricted access area A or deactivate the entire converting machine 1.

The control unit 28 may be further configured to mute the light barrier 14 when the admissible object 24 to be transported is detected by the upstream muting detector 20a. In a similar manner, the control unit 28 may be further configured to activate the light barrier 14 when the admissible object 24 is detected by the downstream muting detector 20b.

In an embodiment, the evaluation unit 26 and the control unit 28 may be combined into a single device. Alternatively, and as previously described, the control unit 28 and the evaluation unit 26 may be two different components.

As long as the light barrier 14 is activated, any intrusion of a prohibited object 32 will generate an error signal 27, and the control unit 28 will generate the stop signal 29 to the converting machine 1.

Once the upstream muting detector 20a is triggered, e.g. by means of an admissible object 24 to be transported, a corresponding muting signal 21a is provided. The light barrier 14 is then muted (turned off) at the beginning of the issued muting signal 21a of the upstream muting detector 20a. The muting of the light barrier 14 stops once the muting signal 21b of the downstream muting detector 20b detects the completed passage of object 24. As the light barrier 14 is muted, the admissible object 24 may pass without triggering an error (i.e. an intrusion signal) from the light barrier 14. Hence, the security system is configured to only be activated when the light barrier 14 is muted.

In this event, additional prohibited objects 32, such as a body part of an operator may pass the access opening 12. For this reason, the sensors 22 are configured to detect an occupation of each respective control zone Z.

Based on the evaluation of the individual control signals 23a to 23f, the evaluation unit 26 is configured to determine a shape of the object 24, 32 which passes the access opening 12. If the determined shape is not rectangular, or, in an alternative, does not fit a predetermined shape, the evaluation unit 26 may consider this an error state. Consequently, based on the error signal 27, the full converting machine 1 or the workstation 8, 9 in the restricted access area A may be turned off.

As illustrated in FIG. 2, the admissible object 24 moves along the direction of transportation T towards the restricted access area A. The object 24 will first trigger the upstream muting detector 20a to mute the light barrier 14. The sensors 22a to 22f in the detection unit can be activated when the upstream muting detector 20a generates a muting signal 21. Thus, the control unit 28 may be configured to activate the sensors 22a to 22f when the upstream muting detector 20a generates a muting signal 21.

The plurality of sensors 22a to 22f are configured to detect the passage of the object 24, 32 by detecting a front leading edge E1 and a rear edge E2 of the object 24, 32. The detection of the front leading edge E1 is characterized by a rising signal 36a and the detection of the rear edge is characterized by a falling signal 36b. The sensors 22a to 22f generate individual control signals 23a to 23f related to the detection of the front leading edge E1 and the rear edge E2 of the object 24, 32.

Once the individual control zones Z of the sensors 22a to 22f are occupied by an object 24, 32, the respective control signals 23a to 23f change from a first state 34 to a second state 36. This is schematically represented in for instance FIG. 4b, which shows the individual control signals 23a to 23f in relation to the time t.

The present security system 10 detects an error state by analyzing a first time t1 at which the sensors 22a to 22f detect a switch from a first state to a second state and a second time t2 at which a switch occurs between a second state and a first state. The first time t1 and the second time t2 are determined by the evaluation unit 26. The switch between a first state 34 to a second state 36 occurs upon the detection of the front leading edge E1 and the rear edge E2 of an object 24, 32 within the respective control zone Z. Hence, the first time t1 occurs at a rising signal 36a and the second time t2 occurs at a falling signal 36b.

The first time t1 thus corresponds to the arrival time t1 of the front leading edge E1 to each respective control zone and the second time t2 corresponds to the departure time t2 of the rear edge E2 from the respective control zone of an object 24, 32 transported through each of the control zones Z. In other words, the detection unit 20 is configured to detect an arrival time t1 to each control zone Z and a departure time t2 from each control zone Z of an object 24, 32 transported through the control zones Z.

As illustrated in FIGS. 4a to 9b, the present security system 10 is configured to detect prohibited objects 32 placed in various positions in the proximity of an admissible object 24. These illustrated scenarios only represent a selection of possible error scenarios.

Figure 4A:
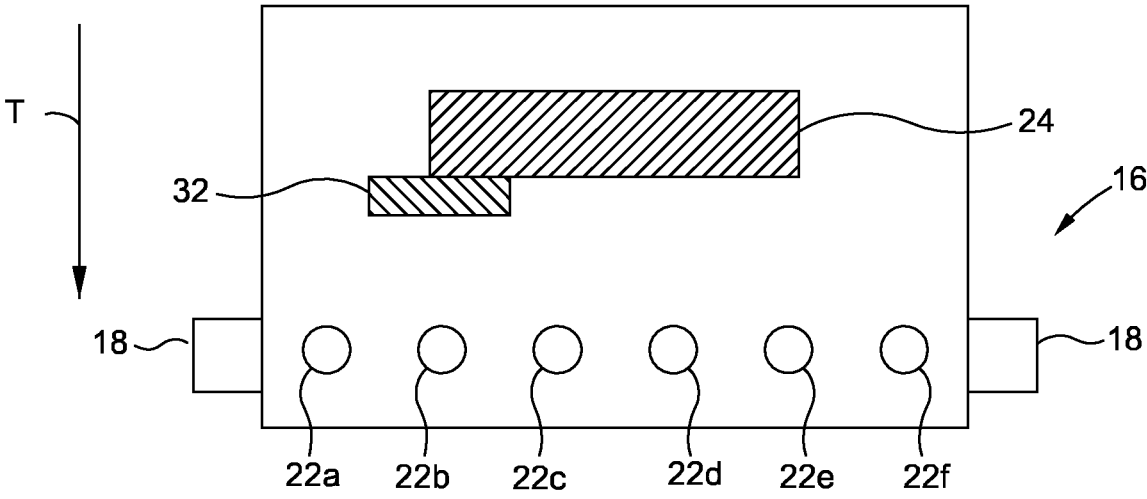
FIGS. 4a and 4b are schematic top views of an intrusion scenario at an access area to a restricted zone, and a diagram of the generated detection signals.

In a first scenario, and as illustrated in FIG. 4a, the additional prohibited object 32 is arranged in front of the admissible object 24 and is partially overlapping the admissible object 24 in the lateral direction L (FIG. 2).

Figure 4B:
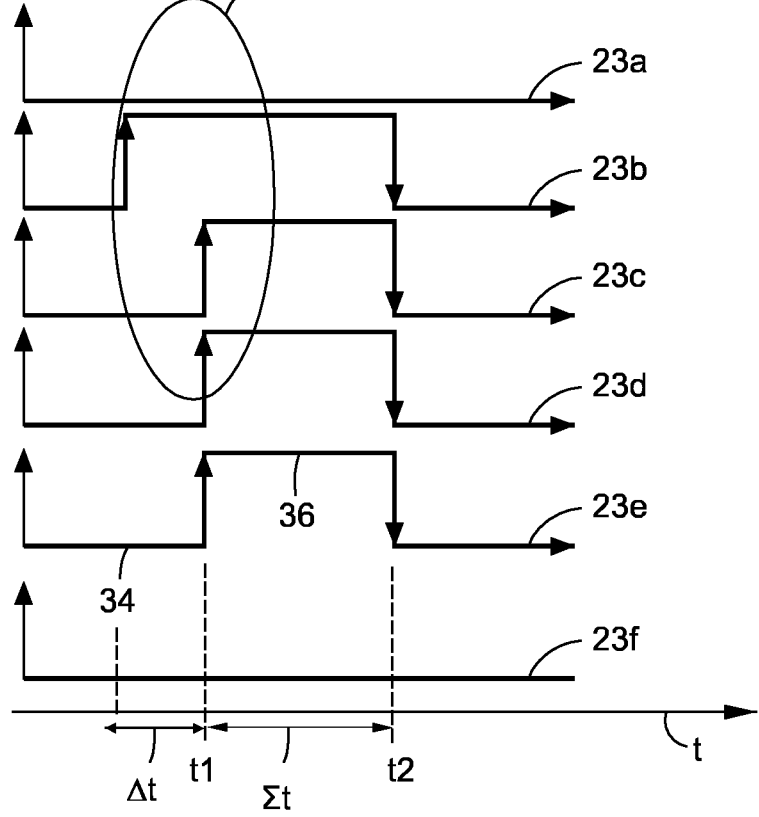

As illustrated in FIG. 4b, the evaluation unit 6 is configured to calculate a time duration $\Sigma t$ between a rising signal and a falling signal from each sensor. The evaluation unit 26 is further configured to determine the presence of an error state based on differences in the time duration $\Sigma t$ among the individual control signals 23a to 23f with regard to the switch between the first state 34 and the second state 36. As an example, since the time duration $\Sigma t\_23b$ of the control signal 23b is different than the time duration of the other triggered control signals 23c to 23e, the evaluation unit 26 may determine that an error state is present.

Figures 5A, 5B:
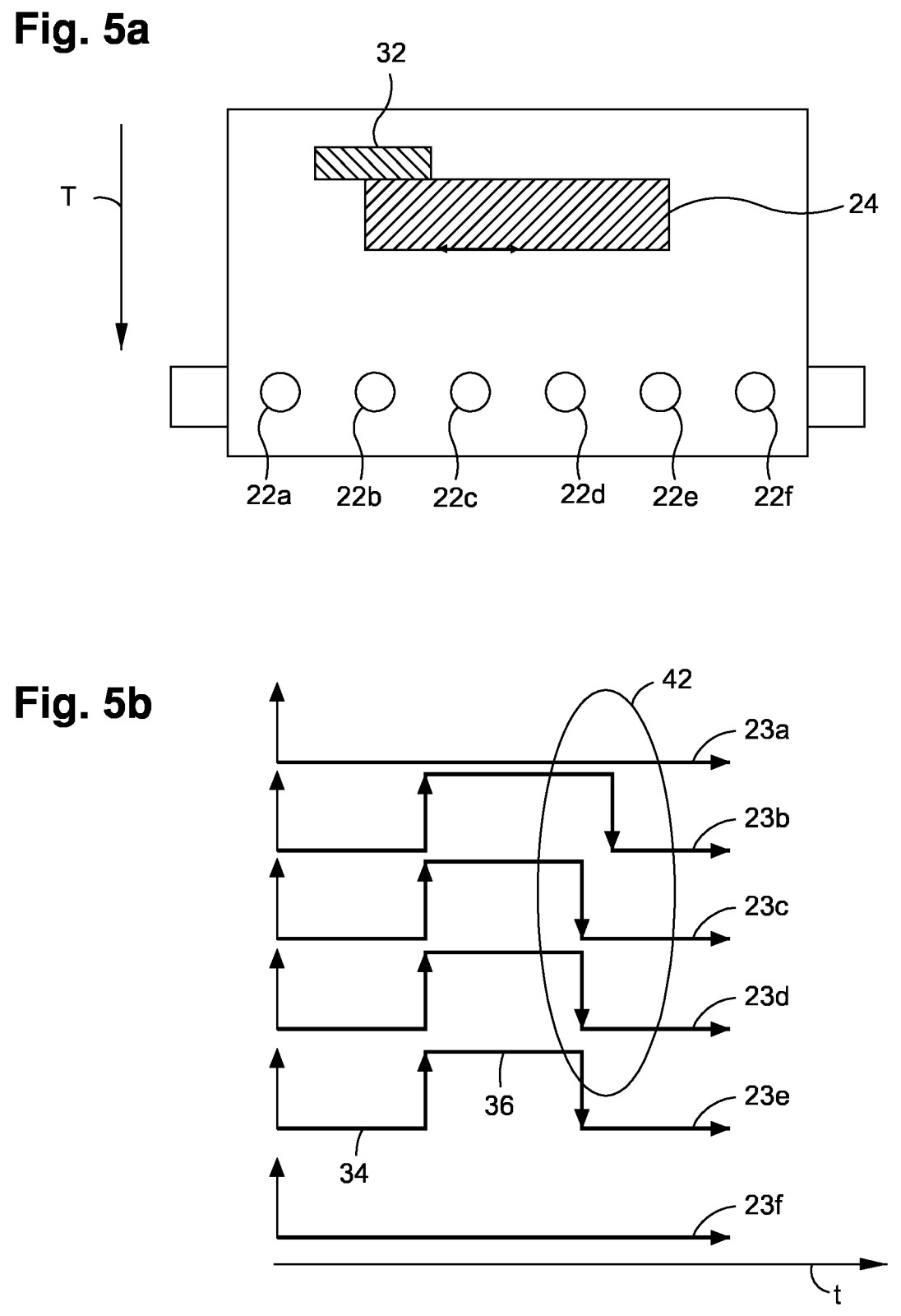

In a second scenario, and as illustrated in FIGS. 5a and 5b, the prohibited object 32 is located behind the admissible object 24 in the direction of transportation T. Similar to the first scenario, the time duration $\Sigma t\_23b$ of the control signal 23b again differs from the time durations $\Sigma t$ of the other triggered control signals 23c to 23e. Hence, the evaluation unit 26 may determine that an error state is present.

Figures 6A, 6B:
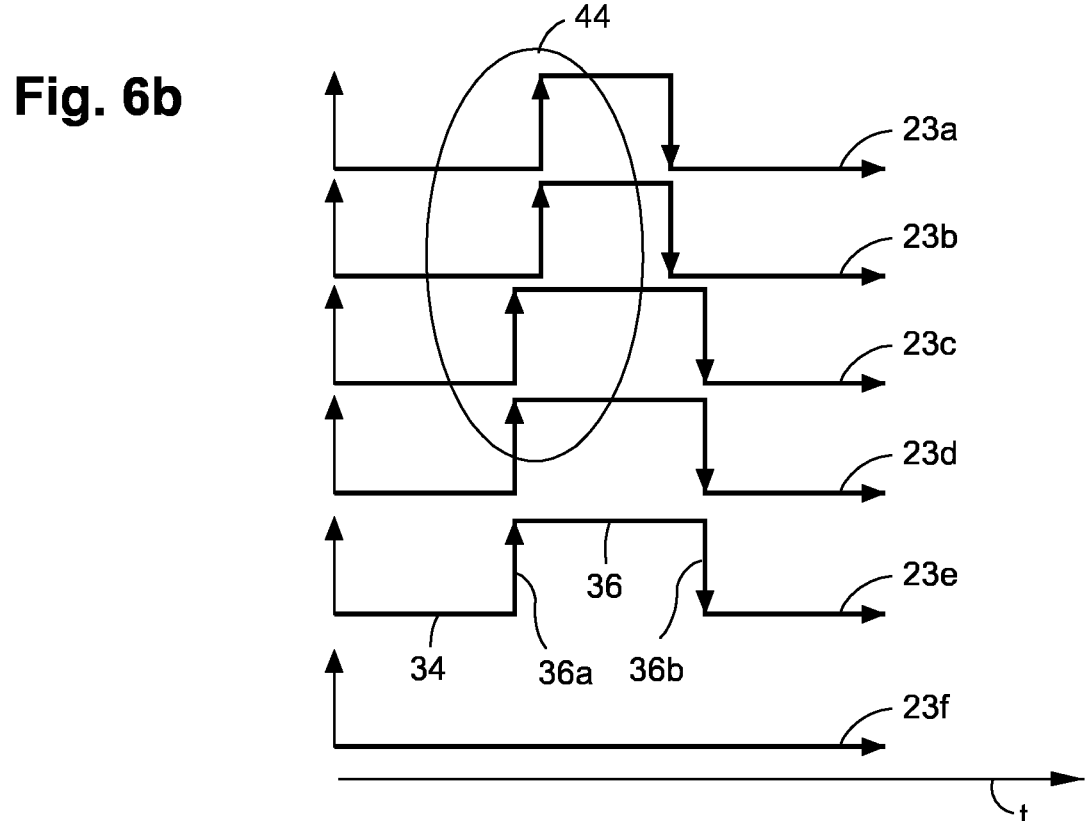
FIGS. 6a and 6b are schematic drawings of yet another intrusion scenario.

In a third scenario, and as illustrated in FIGS. 6a and 6b, the prohibited object 32 is located laterally of the object 24. This error state may again be determined based on a difference among the time durations $\Sigma t$ of the control signals 23a to 23f. The time durations $\Sigma t\_23a$ and $\Sigma t\_23b$ of the control signals 23a and 23b differ from the time durations $\Sigma t\_23c$, $\Sigma t\_23d$, $\Sigma t\_23e$ of the other triggered control signals 23c to 23e.

Figure 7A:
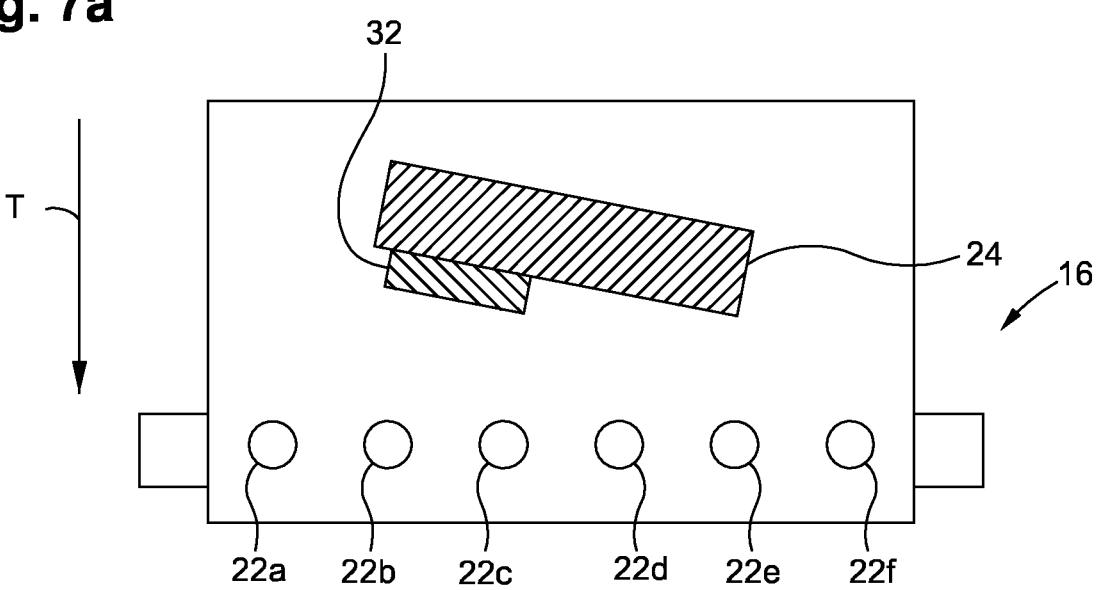
FIGS. 7a and 7b are schematic drawings of an additional intrusion scenario.
Figure 7B:
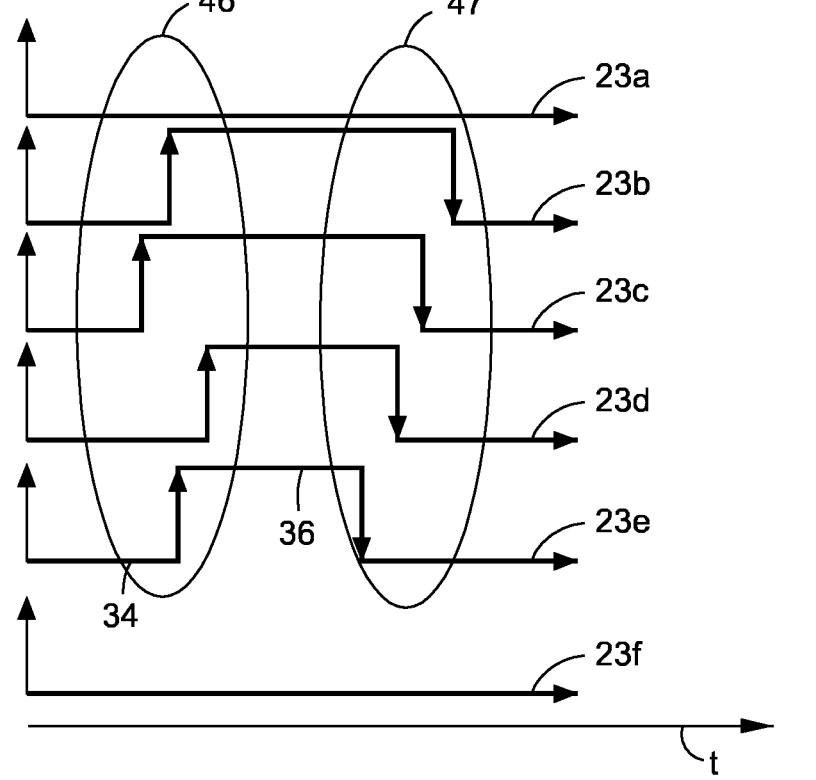

In a fourth scenario, and as illustrated in FIGS. 7a and 7b, the prohibited object 32 is arranged at an angle in front of the admissible object 24.

This error state may be determined based on several different evaluation approaches. Firstly, the time durations of the control signals 23b, 23c and the control signals 23d, 23e are different.

Secondly, the evaluation unit 26 may determine a first order sequence 46 of first state 34 to second state 36 switching events of the control signals (here: 23c-23b-23e-23d) and a second order sequence 47 of second state 36 to first state 34 switching events of the control signals. Since the first order sequence 46 fails to match the second order sequence 47, an error state may be determined.

Thirdly, the evaluation unit 26 may determine the phase of each switching event for each sensor and then determine the phase differences, also referred to as phase shifts $\Delta t$ between same type of switching events (first state 34 to second state 36 or second state 36 to first state 34) of different control signals 23. The phase shifts between the control signals 23a to 23f from adjacent sensors can be analyzed to determine the phase shifts between the adjacent sensors. Hence, the evaluation unit may calculate a phase shift $\Delta t$ between rising signals 36a of directly adjacent sensors 22. Similarly, the evaluation unit may calculate a phase shift $\Delta t$ between falling signals 36b of directly adjacent sensors 22. The error state is then determined when a phase shift is present among the rising signals and/or the falling signals.

Figure 8A:
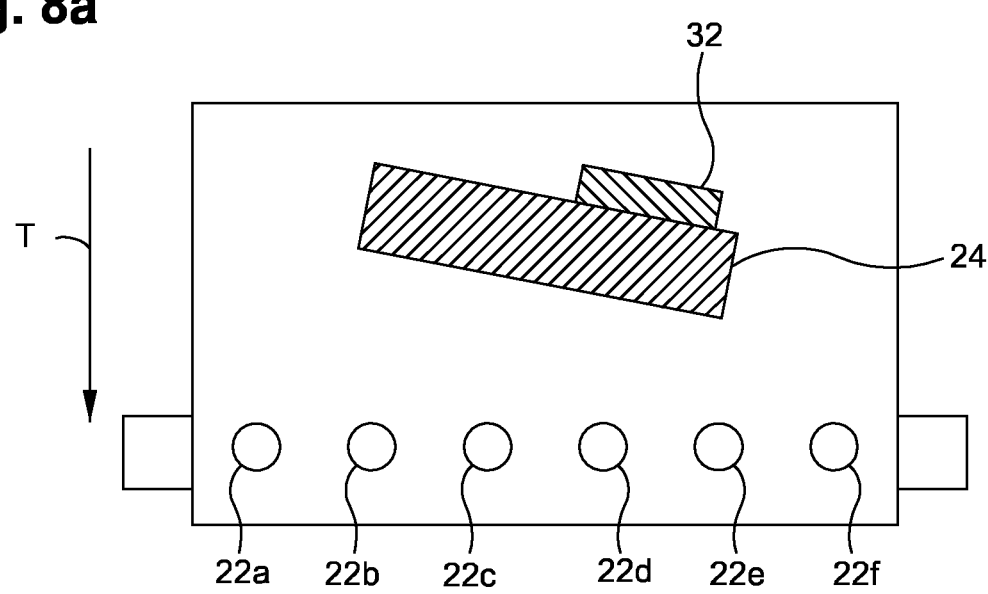
FIGS. 8a and 8b are schematic drawings of an additional intrusion scenario.
Figure 8B:
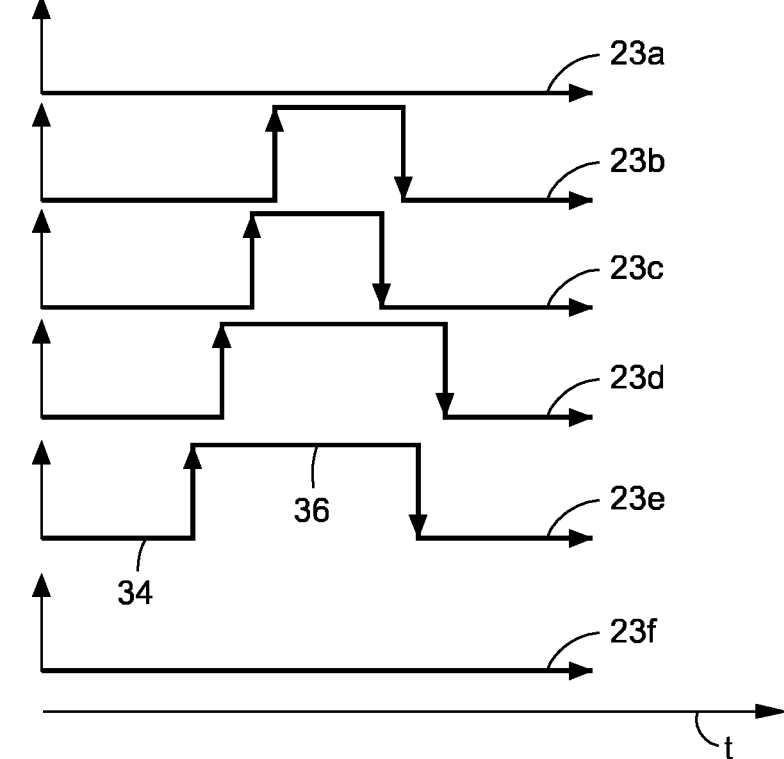

In a fifth scenario, and as illustrated in FIGS. 8a and 8b, the error state may be determined based on comparisons of the time durations of the control signals 23a to 23f, the first order sequence 46 and the second order sequence 47 and the phase differences. Any combination of these approaches may be used as well in order to determine the presence of an error state.

Figures 9A, 9B:
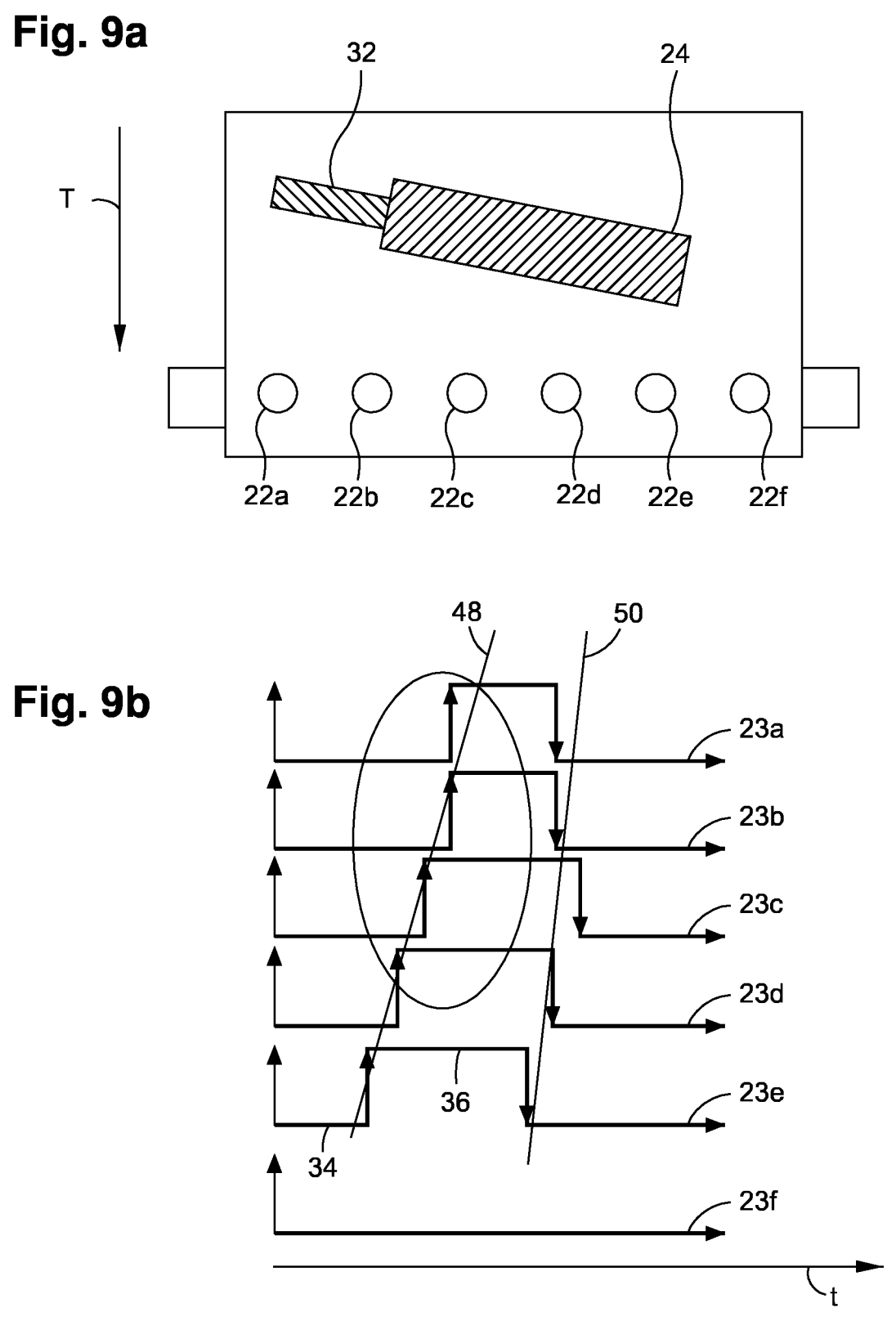

In a sixth scenario, and as illustrated in FIGS. 9a and 9b, the prohibited object 32 is located laterally of the admissible object 24 to be loaded. Both the prohibited object 32 and the admissible object 24 are arranged at an angle in relation to the direction of transportation T.

The evaluation unit 26 may determine this error state based on the before-mentioned approaches. In addition, the evaluation unit 26 may determine an interpolated first timeline 48 defined by first state 34 to second state 36 switch events. In other words, the points of time at which the first state 34 to second state 36 switch events occur are used to determine an interpolated first timeline 48 of the switch events of the control signals 23 in relation to time t. For example, linear regression may be used in this regard. Moreover, the evaluation unit 26 may determine an interpolated second timeline 50 of second state 36 to first state 34 switch events of the respective control signals 23*a* to 23*e* vs. time. Since the interpolated first timeline 48 and second timelines 50 are not parallel to each other, the evaluation unit 26 may determine an error state to be present.

The interpolated timelines 48, 50 may be advantageous if a sensor 22 is misfunctioning and no respective control signal is received by the evaluation unit.

In an embodiment, the predefined order can be determined to be different (non-linear) for stacks that do not have straight edges. Accordingly, the evaluation unit 26 may be connected to the memory 25 and retrieve information regarding the shape of the admissible objects 24 to be transported.

Furthermore, the evaluation unit 26 may be provided with information regarding predetermined threshold values in view of the determined differences. Such information may e.g. be stored in the memory 25 connected to the evaluation unit 26. The memory 25 contains a program to cause the evaluation unit 26 to determine an error state indicating the presence of a prohibited access based on the arrival time t1 and/or the departure time t2 to each control zone Z. An error state may be determined to be present only if the difference in view of the inspected property is larger than a respective predetermined threshold value. Furthermore, the shape of the object 24 to be loaded may be provided to the evaluation unit 26 such that the determination of an error state may include such information.

Figure 10:
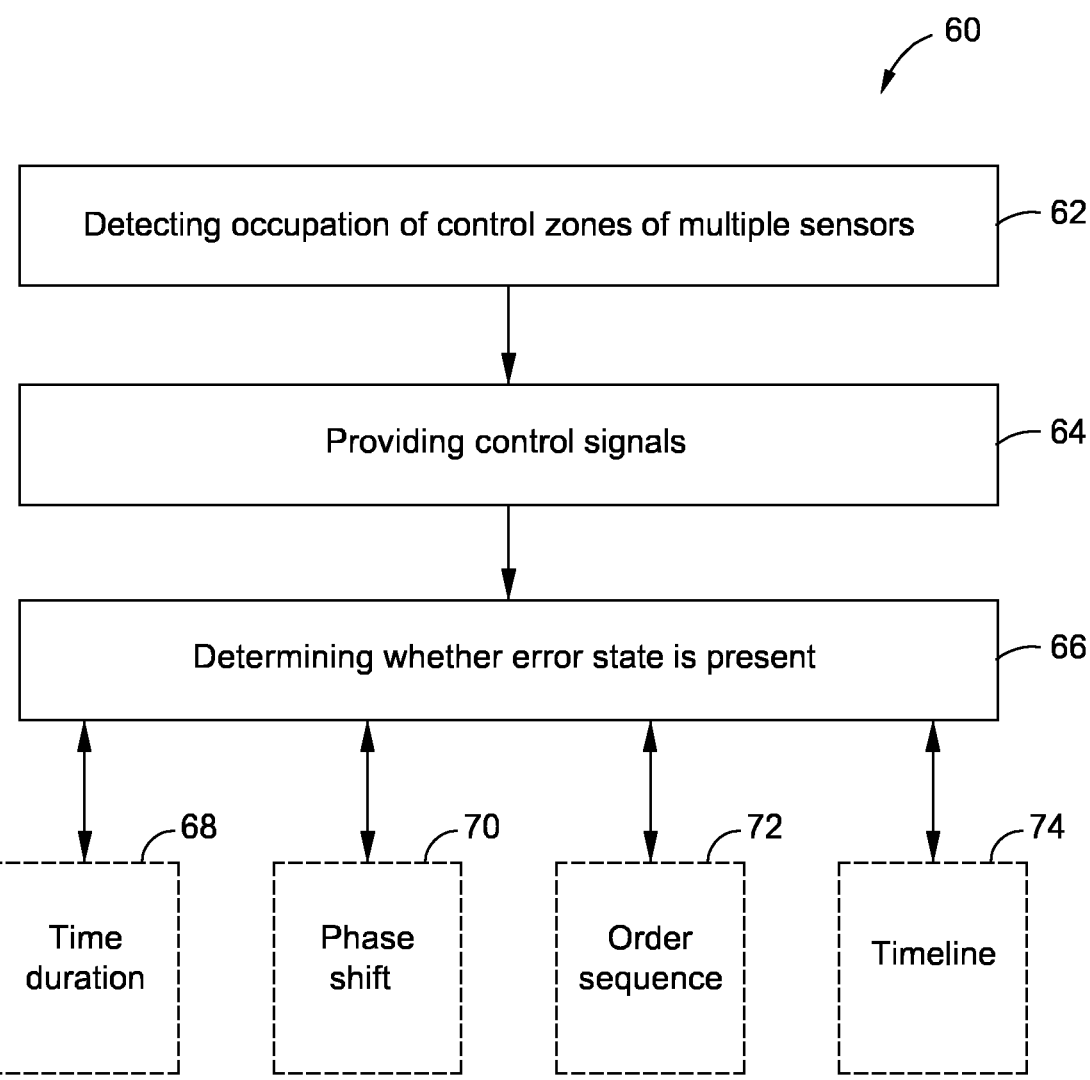
FIG. 10 is a schematic drawing of a method of securing a restricted area in a converting machine.

FIG. 10 is a schematic drawing of a method 60 for preventing prohibited access while conveying objects through a converting machine.

In a first step 62, the presence of an object 24, 32 within control zones Z of multiple sensors 22 are detected. Each sensor 22 has a sensing range covering an individual control zone Z.

In a second step 64, control signals 23 of the sensors 22 are provided to the evaluation unit 26. In this regard, a control signal 23 changes between a first state 34 to a second state 36 upon the detection of the front leading edge E1 and the rear edge E2 of an object 24, 32 within the respective control zone Z. The control signals 23 are provided to the evaluation unit 26 when a change in the sensor state has been detected. The first and second times t1, t2, also named detection times t1, t2 of the rising signals and falling signals of each sensor 22 are determined and analyzed.

In a third step 66, the control signal 23 are analyzed according to at least one criteria. The selected criteria are the differences in a) duration of time Σt of each individual sensor signal, b) the phase shifts Δt among adjacent sensor signals, c) the order sequence of multiple control signals 23.

d) the interpolated timelines 48, 50 of a first switching event and a second switching event.

Preferably, all criteria are analyzed in order to determine an error state.

The invention claimed is:

1. A security system for a converting machine, the security system comprising:

a detection unit comprising a plurality of sensors arranged side by side and wherein each sensor having an individual control zone, the detection unit being configured to detect an arrival time to each control zone and a departure time from each control zone of an object transported through the control zones, the arrival time and the departure time of the object being determined from control signals from each sensor, and wherein the control signals from each sensor comprise a rising signal and falling signal, and wherein each sensor having a vertical sensing direction, an evaluation unit configured to receive the control signals from each sensor of the detection unit and determine the arrival time from the rising signal and departure time from the falling signal and to provide an error signal when an error state is determined, a memory containing a program to cause the evaluation unit to determine an error state indicating the presence of a prohibited object based on the arrival time and/or the departure time in each control zone, and a light barrier system comprising a light barrier and a muting device, the muting device comprising an upstream muting detector and a downstream muting detector located on opposite sides of the light barrier, wherein the security system comprises a control unit configured to activate the muting device in order to mute the light barrier when an admissible object to be transported is detected by the upstream muting detector, and to activate the light barrier when the admissible object is detected by the downstream muting detector, and wherein the sensors in the detection unit are configured to be activated when the upstream muting detector generates a muting signal and the light barrier is muted, and wherein the control unit is configured to receive the error signal from the evaluation unit and to generate a stop signal when an error state is detected.

2. The security system according to claim 1, wherein the sensors are positioned in a line at an equal distance from each other.

3. The security system according to claim 1, wherein the sensors comprise a photoelectric cell, a laser scanner, or a capacitive sensor.

4. The security system according to claim 1, wherein the evaluation unit is further configured to calculate a time duration between a rising signal and a falling signal from each sensor and wherein the evaluation unit is configured to determine an error state if the time duration differs for each sensor.

5. The security system according to claim 1, wherein the evaluation unit is further configured to calculate a phase shift between rising signals of directly adjacent sensors, and wherein the error state is determined when a phase shift is present.

6. The security system according to claim 5, wherein the evaluation unit is configured to determine a first order sequence of first state-to-second state switch events of received control signals and a second order sequence of second state-to-first state switch events of received control signals, and wherein the error state is determined based on differences between the first order sequence and the second order sequence.

7. The security system according to claim 6, wherein the evaluation unit is configured to determine an interpolated first timeline defined by first state-to-second state switch events of received control signals and to determine an interpolated second timeline defined by second state-to-first state switch events of received control signals, and wherein the error state is determined based on non-parallel first and second timelines.

8. The security system according to claim 1, wherein the control unit is configured to generate a stop signal to deactivate a workstation of a converting machine or to deactivate an entire converting machine when an error signal is received from the evaluation unit.

9. A converting machine comprising the security system according to claim 1, wherein the sensors are horizontally arranged above a travel path in the converting machine and positioned over an access opening to a restricted access area in the converting machine.

10. A method for securing a restricted access area in a converting machine, the method comprising:

receiving information from an upstream muting detector and generating a muting signal to turn off a light barrier when an admissible object to be transported is detected, activating a plurality of sensors in a detection unit when a light barrier is turned off, detecting an arrival time and a departure time of an object within control zones of the plurality of sensors, the sensors having a vertical sensing direction, receiving control signals from each sensor to an evaluation unit, the control signals defining the arrival time from a rising signal and the departure time from a falling signal, and determining the presence of a prohibited object based on the arrival time and departure time of each control signal.

11. The method according to claim 10, wherein determining the presence of the prohibited object includes:

determining a difference between a time duration for each of the control signals from a first state to a second state from each sensor, and/or determining a phase shift between subsequent switching points in time of different individual control signals from different sensors, and/or determining a difference between a first order sequence of a first state-to-second state switch events of control signals and a second order sequence of second state-to-first state switch events of control signals, and/or determining non-parallel interpolated first and second timelines, wherein the interpolated first timeline is defined by first state-to-second state switch events of control signals and the interpolated second timeline is defined by second state-to-first state switch events of control signals.

* * * * *